(12) United States Patent
Vlachogiannis et al.

(10) Patent No.: US 10,061,680 B2
(45) Date of Patent: Aug. 28, 2018

(54) MOBILE APPLICATION ERROR MONITORING SYSTEM

(71) Applicant: Splunk Inc., San Francisco, CA (US)

(72) Inventors: Ioannis Vlachogiannis, San Francisco, CA (US); Vasileios Karampinas, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 58 days.

(21) Appl. No.: 15/339,950

(22) Filed: Nov. 1, 2016

(65) Prior Publication Data

US 2017/0046244 A1    Feb. 16, 2017

Related U.S. Application Data

(63) Continuation of application No. 15/143,578, filed on Apr. 30, 2016, now Pat. No. 9,514,021, which is a
(Continued)

(51) Int. Cl.
*G06F 11/00* (2006.01)
*G06F 11/34* (2006.01)
(Continued)

(52) U.S. Cl.
CPC .......... *G06F 11/3495* (2013.01); *G06F 9/542* (2013.01); *G06F 11/0709* (2013.01); *G06F 11/0715* (2013.01); *G06F 11/0742* (2013.01); *G06F 11/0775* (2013.01); *G06F 11/302* (2013.01); *G06F 11/3003* (2013.01); *G06F 11/3013* (2013.01); *G06F 11/3082* (2013.01); *G06F 11/34* (2013.01);
(Continued)

(58) Field of Classification Search
CPC ............ G06F 11/3409; G06F 11/3495; G06F 11/0742; G06F 11/3013; G06F 11/3082
See application file for complete search history.

(56) References Cited

U.S. PATENT DOCUMENTS 7,509,539 B1    3/2009 Denefleh et al.
8,255,902 B1    8/2012 Satish
(Continued)

OTHER PUBLICATIONS

United States Patent and Trademark Office, U.S. Appl. No. 14/215,667, Notice of Allowance dated Jan. 9, 2015.
(Continued)

*Primary Examiner* — Charles Ehne
(74) *Attorney, Agent, or Firm* — Wong & Rees LLP; Kirk D. Wong

(57) ABSTRACT

A quality score for a computer application release is determined using a first number of unique users who have launched the computer application release on user devices and a second number of unique users who have encountered at least once an abnormal termination with the computer application release on user devices. Additionally or optionally, an application quality score can be computed for a computer application based on quality scores of computer application releases that represent different versions of the computer application. Additionally or optionally, a weighted application quality score can be computed for a computer application by further taking into consideration the average application quality score and popularity of a plurality of computer applications.

20 Claims, 7 Drawing Sheets

Related U.S. Application Data continuation of application No. 14/929,290, filed on Oct. 31, 2015, now Pat. No. 9,355,006, which is a continuation of application No. 14/610,944, filed on Jan. 30, 2015, now Pat. No. 9,208,000, which is a continuation of application No. 14/215,667, filed on Mar. 17, 2014, now Pat. No. 8,990,637.

(51) Int. Cl.
  *G06F 11/07* (2006.01)
  *G06F 9/54* (2006.01)
  *G06F 11/30* (2006.01)
  *G06F 8/77* (2018.01)

(52) U.S. Cl.
  CPC ...... *G06F 11/3409* (2013.01); *G06F 11/3466* (2013.01); *G06F 8/77* (2013.01); *G06F 11/3093* (2013.01); *G06F 11/3476* (2013.01); *G06F 2201/86* (2013.01); *G06F 2201/865* (2013.01); *G06F 2201/88* (2013.01)

(56) References Cited

U.S. PATENT DOCUMENTS

| | | | |
|---|---|---|---|
| 8,880,689 B2 | 11/2014 | Yamanaka et al. | |
| 8,990,637 B1 | 3/2015 | Vlachogiannis et al. | |
| 9,043,317 B2 | 5/2015 | Cosgrove et al. | |
| 9,208,000 B2 | 12/2015 | Vlachogiannis et al. | |
| 9,355,006 B2 | 5/2016 | Vlachogiannis et al. | |
| 9,514,021 B2 | 12/2016 | Vlachogiannis et al. | |
| 2005/0144526 A1* | 6/2005 | Banko | G06F 11/079 714/38.12 |
| 2006/0036536 A1 | 2/2006 | Williams et al. | |
| 2006/0070037 A1 | 3/2006 | Canning et al. | |
| 2010/0138775 A1* | 6/2010 | Kohen | G06F 9/4443 715/781 |
| 2012/0036498 A1 | 2/2012 | Akirekadu et al. | |
| 2012/0084438 A1* | 4/2012 | Raleigh | H04L 41/046 709/224 |
| 2012/0166869 A1* | 6/2012 | Young | G06F 11/008 714/15 |
| 2012/0317234 A1 | 12/2012 | Bohrer et al. | |
| 2013/0163438 A1 | 6/2013 | Wilkinson | |
| 2013/0166731 A1 | 6/2013 | Yamanaka et al. | |
| 2013/0166967 A1* | 6/2013 | Jerde | G06F 11/30 714/48 |
| 2013/0219048 A1 | 8/2013 | Arvidsson et al. | |
| 2013/0329777 A1 | 12/2013 | Konda et al. | |
| 2013/0346473 A1 | 12/2013 | Glider et al. | |
| 2014/0033055 A1 | 1/2014 | Gardner et al. | |
| 2014/0075567 A1* | 3/2014 | Raleigh | H04W 12/10 726/26 |
| 2014/0310392 A1 | 10/2014 | Ho | |
| 2015/0261585 A1 | 9/2015 | Vlachogiannis et al. | |
| 2015/0295808 A1 | 10/2015 | O'Malley et al. | |
| 2016/0055071 A1 | 2/2016 | Vlachogiannis et al. | |
| 2016/0065419 A1 | 3/2016 | Szilagyi et al. | |
| 2016/0246696 A1 | 8/2016 | Vlachogiannis et al. | |

OTHER PUBLICATIONS

United States Patent and Trademark Office, U.S. Appl. No. 14/610,944, Notice of Allowance dated Oct. 19, 2015.
United States Patent and Trademark Office, U.S. Appl. No. 14/929,290, Notice of Allowance dated Feb. 9, 2016.
United States Patent and Trademark Office, U.S. Appl. No. 15/143,578, Notice of Allowance dated Aug. 8, 2016.

\* cited by examiner determine a first number of unique users who have launched the computer application release 502 determine a second number of unique users who have encountered an abnormal termination of a computer application release 504 use the first number of unique users and the second number of users as numeric input to compute a quality score for the computer application release 506

FIG. 5A

MOBILE APPLICATION ERROR MONITORING SYSTEM

CROSS-REFERENCE TO RELATED APPLICATIONS

This application claims benefit under 35 U.S.C. § 120 as a Continuation of U.S. application Ser. No. 15/143,578, filed Apr. 30, 2016, which claims benefit under 35 U.S.C. § 120 as a Continuation of U.S. application Ser. No. 14/929,290, filed Oct. 31, 2015, now U.S. Pat. No. 9,355,006, issued May 31, 2016, which claims benefit under 35 U.S.C. § 120 as a Continuation of U.S. application Ser. No. 14/610,994, filed Jan. 30, 2015, now U.S. Pat. No. 9,208,000, issued Dec. 8, 2015, which claims benefit as a Continuation of U.S. application Ser. No. 14/215,667, filed Mar. 17, 2014, now U.S. Pat. No. 8,990,637, issued Mar. 24, 2015, The entire contents of each of the above-listed applications is hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNOLOGY

The present invention relates generally to computer application releases, and in particular, to computing and accessing quality indicators of computer applications.

BACKGROUND

The popularity of computer applications depends on many factors such as quality, timing, functionality, market demands, etc. Among these factors, the quality of a computer application is expected to be a large determinant factor influencing the popularity of the computer application. Particularly, a computer application may only represent one choice among many different computer applications in a crowded field. Users who have ready access to computing devices such as mobile devices can easily choose to stay with an existing computer application or switch from one computer application to another computer application until a satisfying computer application is found. Even for the same computer application, different releases may be of different qualities and thus produce different levels of satisfactions and popularities.

However, assessing the quality of computer applications is often difficult in a highly diverse, mobile environment where users can use many different types of devices and have many different choices of computer applications. As a result, many approaches of assessing the quality of computer applications require high costs, yet still produce only inaccurate, unreliable, repetitive, partial, anecdotal results.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 5A through FIG. 5B depict example process flows; and

DESCRIPTION OF EXAMPLE EMBODIMENTS

Figure 1:
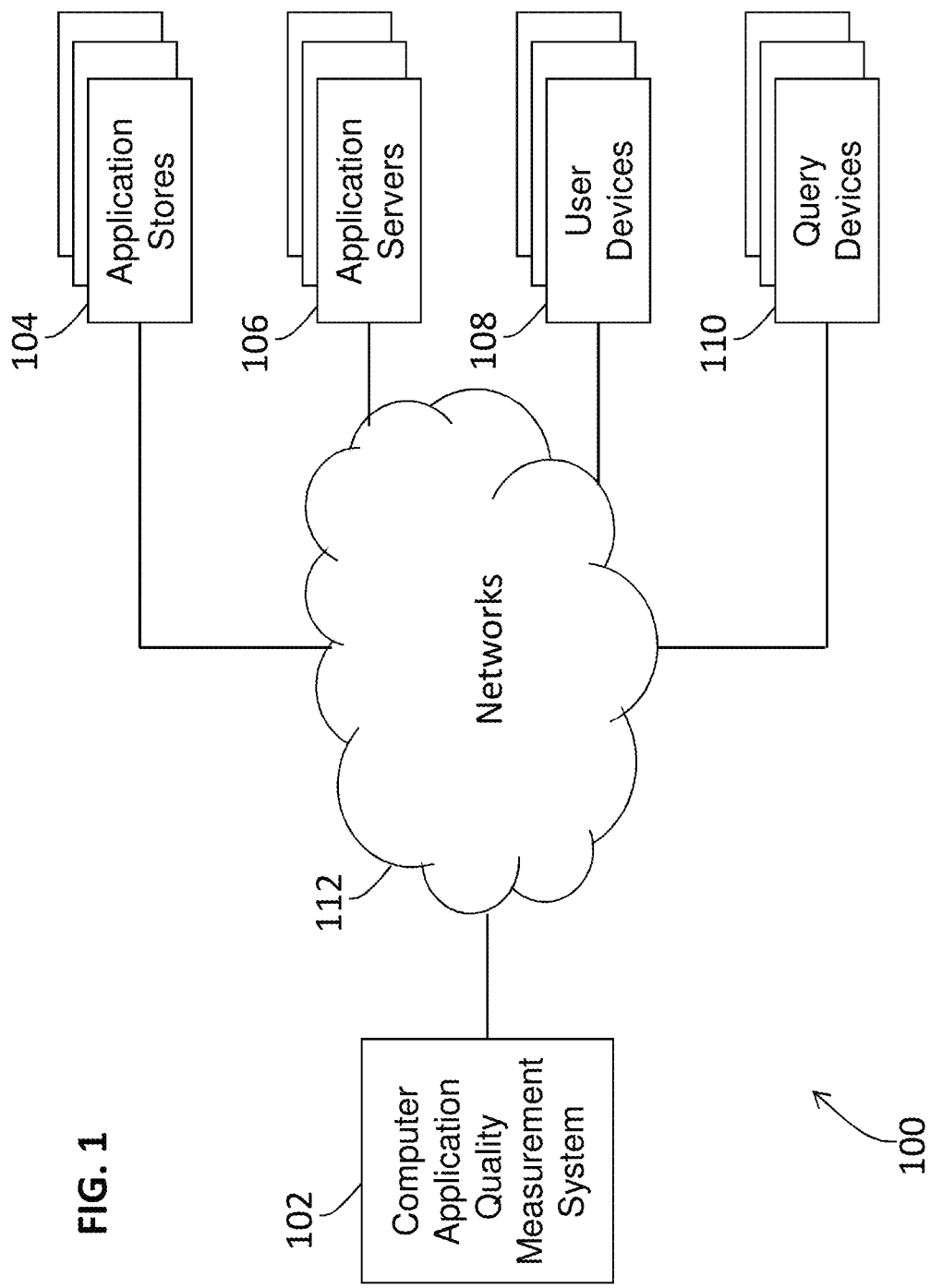
FIG. 1 depicts an example configuration in which some embodiments may operate.

Example embodiments, which relate to computing and accessing quality indicators of computer applications, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. STRUCTURE OVERVIEW
3. APPLICATION EVENT REPORT EMITTER
4. APPLICATION QUALITY MEASUREMENT SYSTEM
5. EXAMPLE QUALITY SCORE COMPUTATIONS
6. EXAMPLE PROCESS FLOWS
7. IMPLEMENTATION MECHANISMS—HARDWARE OVERVIEW
8. EQUIVALENTS, EXTENSIONS, ALTERNATIVES AND MISCELLANEOUS

1. General Overview

This overview presents a basic description of some aspects of embodiment(s) of the present invention. It should be noted that this overview is not an extensive or exhaustive summary of aspects of the embodiment. Moreover, it should be noted that this overview is not intended to be understood as identifying any particularly significant aspects or elements of the embodiment(s), nor as delineating any scope of the embodiment(s) in particular, nor the invention in general. This overview merely presents some concepts that relate to example embodiments in a condensed and simplified format, and should be understood as merely a conceptual prelude to a more detailed description of example embodiments that follows below.

Computer applications such as mobile applications can be deployed or launched on a wide variety of computing devices. Given many choices of computer applications, users expect more from the computer applications that are selected than from other computer applications that are not selected. For example, a user may try out a few computer applications with similar functionalities and select a winner that is relatively stable, relatively up-to-date, relatively fast in release delivery, relatively rich in functionalities or options, etc., among the computer applications. Satisfied users tend to reward their favorite computer applications with better ratings, more positive social networking feedbacks, higher usage, higher loyalty, etc.

Techniques as described herein can be used to compute and assess quality indicators of computer applications with a high degree of accuracy, reliability, completeness, etc., as compared with other approaches.

In some embodiments, computer application releases can be instrumented to emit two simple types of application event reports, namely application launch event reports and application abnormal termination reports. The instrumentation of a computer application release for emitting these types of application event reports can be made by incorporating a sequence of code, a computer class, a computer object, a computer function, etc., from an instrumented code source (e.g., a system development kit, a code library, etc.) at a programming time, compilation time, linking time, machine code assembly time, runtime, etc. Additionally, optionally, or alternatively, instrumented code for emitting these types of application event reports may be incorporated into entities that are parts (e.g., responsible for process management, etc.) of runtime environments of the computer application releases.

Application event reports such as application launch report events, application abnormal termination report events, etc., can be collected by a computer application quality measurement system with any of a wide variety of communication mechanisms (e.g., internet, WiFi, small message service or SMS, instant messaging, connectionless transport, connectionless transport, constant network access, transient network access, fast network connection, slow network connection, etc.) from a wide variety of diverse user devices on which the computer application releases have been launched by users.

Based on the application launch event reports received for a computer application release, the total number of unique users who have launched the computer application release in any given time period can be determined, regardless of how many times each of these users has launched the computer application release in the given time period. Likewise, based on the application abnormal termination event reports received for the computer application release, the total number of affected unique users who have experienced abnormal terminations of the computer application release in the given time period can be determined, regardless of how many times each of these users has experienced abnormal terminations of the computer application release in the given time period.

A quality score of the computer application release in the given period can then be computed using the total number of unique users and the total number of affected unique users in the given period. In some embodiments, the quality score can be represented by a percentile of unaffected unique users (the total number of unique users minus the total number of affected unique users) in the total number of unique users in the given period. In these embodiments, a quality score of a computer application release is a value in a score range of 0-100. In other embodiments, different score ranges can be used.

If a computer application has multiple (computer application) releases, an individual quality score can be computed for each of some or all of the computer application releases. In some embodiments, the computer application quality measurement system computes up to two individual scores for the last two releases or versions of a computer application. In some embodiments, an overall quality score of a computer application can be computed as a value such as an average derived from one or more individual quality scores of one or more releases or versions of the computer application.

To better compare a computer application with other computer applications, techniques as described herein can also be used to compute a weighted quality score incorporating popularity information for the computer application, popularity and quality score information for a plurality of computer applications that may or may not include the computer application, etc.

Quality scores as described herein are computed based on verifiable metrics derived from application events that occur with computer applications. Techniques as described herein can be used to prevent errors and uncertainty caused by overactive users or dormant users from unduly influencing quality scores of computer applications or their releases.

Under techniques as described herein, quality scores can be computed on a real-time basis or on a non-real-time basis. For example, any of the quality scores as described herein can be computed in response to receiving a query for quality measurement of a computer application or a computer application release. On the other hand, some or all of the quality scores as described herein can be pre-computed (or computed before receiving the query discussed above), for example, at the end of a specific time period, weekly or biweekly on a rolling basis, monthly, yearly, etc.

Quality scores as described herein can be provided to application quality client queries in any of a wide variety of ways. In some embodiments, a graphic display pane or page can be created and delivered to an application quality query client for accessing or viewing quality scores in different granularity levels or bases. For example, with a single glance at quality scores of two latest versions of a computer application, an application quality query client such as a mobile application team, etc., can obtain an objective measure such as a quality score calculated based at least in part on application crashes and thus may be indicative of user satisfaction and of the impact the latest version and/or the latest error fixes had on user satisfaction. In some situations, quality scores above a first threshold (e.g., system configurable, user configurable, set to a default value but may be overridden by a system and/or a user, etc.) such as 80 in the score range of 0-100 may be indicative of high user satisfaction; quality scores below a second threshold such as 40 in the score range of 0-100 may be indicative of a warning that users are disengaging.

Quality scores as described herein can also be used to evaluate relative qualities of different releases or versions of the same computer application. For example, if a new version of the computer application has a score of 77 as compared with a prior version that has a score of 70, the mobile application team has made priority fixes that matter most to users/customers.

A variety of clients can use quality scores computed under techniques as described herein. For example, weighted quality indicators and other popularity measures, as computed on the basis of unique users, can be used together to assess the quality and popularity of a computer application or a computer application release by one or more of advertisers who use computer application releases to advertise, investors interested in application developers or mobile applications, potential clients interested in gauging/tracking the quality and popularity of computer applications, etc.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1 depicts an example configuration 100 comprising a computer application quality measurement system 102, zero, one or more (e.g., cloud-based, on-premise, etc.) computer application stores 104, zero, one or more (e.g., cloud-based, on-premise, etc.) application servers 106, one or more user devices 108, one or more application quality query devices 110, etc. As illustrated in FIG. 1, the computer application quality measurement system (102) may be communicatively and/or operatively linked with the computer application stores (104), the application servers (106), the (set of, population of, etc.) user devices (108), the application quality query devices (110), etc., via one or more computer networks 112. The computer networks (112) may include, but are not limited to only, any of: the Internet, intranets, local area networks, wide area networks, wired network links, wireless network links, etc.

As used herein, a user device refers to a computing device that is used by one or more users to launch zero, one or more computer application releases of which zero, one or more application event reports can be sent to the application quality measurement system (102). In some embodiments, a user's permission is required for the user device to send application event reports to the application quality measurement system (102). In some embodiments, the user device is communicatively linked with the application quality measurement system (102) at least for some periods of time, but not necessarily constantly; for example, the user device may be communicatively linked with the application quality measurement system (102) only when the user device is at a location where network access is available to the user device. In some embodiments, an application event report is not sent by a user device to the application quality measurement system (102) at a first time when the subject matter of the application event report occurs, but rather is sent by the user device to the application quality measurement system (102) at a second time (later than the first time) when network access is available to the user device for sending the application event report to the application quality measurement system (102).

In some embodiments, application event reports sent from the user devices (108) to the application quality measurement system (102) consist only of two types of application event reports: namely application launch log events and application abnormal termination log events. In some other embodiments, application event reports sent by the user devices (108) to the application quality measurement system (102) comprises more than application launch log events and application abnormal termination log events.

A computer application release as described herein refers to a release or version of a specific computer application; one or more quality scores relating to the specific computer application is to be computed by the computer application measurement system (102). Application event reports collected by the computer application quality measurement system (102) from the user devices (108) may be processed and used by the computer application quality measurement system (102) to calculate one or more quality scores relating to the specific computer application.

A computer application release can be obtained by a user device in the user devices (108) from any of a variety of computer application sources such as one or more of the computer application stores (104), the application servers (106), another user device in the user devices (108), etc.

In some embodiments, a computer application release may have been pre-installed, pre-configured, pre-upgraded, etc., on a user device before a user uses the user device.

In some embodiments, a computer application release as described herein may not have been installed; for example, an application server (e.g., a cloud-based application server, an on-premise application server, etc.) in the application servers (106) can be accessed for downloading on demand.

In some embodiments, a computer application release as described herein may not even need to be installed on a user device; for example, an application server (e.g., a cloud-based application server, an on-premise application server, etc.) in the application servers (106) can be accessed to launch on demand.

In some embodiments, different users who use any, some, or all of, the user devices (108) launch different mixes of computer application releases. In an example, some users may launch computer application releases representing versions of some computer applications, while some other users may launch other computer application releases representing versions of other computer applications. In another example, some users may launch a computer application release representing the latest official version of a computer application, while some other users may launch one or more other computer application releases representing one or more versions of the computer application other than the latest official version of the computer application.

An application quality query device as described herein refers to a computing device that is configured to query a computer application quality measurement system (e.g., 102, etc.) for quality indications of one or more computer applications, receive one or more quality indications relating to the one or more computer applications, etc. Examples of application quality query devices may include, but are not limited to only, any of: the application store (104), the application servers (106), the user devices (108), application developers' computing devices, etc.

In some embodiments, permission is implicitly or explicitly required in order for a user device 108 to send, the computer application quality measurement system 102 to receive, or a query device 110 to access a quality indication for a specific computer application. In some embodiments, quality indications of computer application releases may be limited to application developers of the computer application releases. In some embodiments, users with accounts that have been granted specific permissions can access quality indications of computer application releases. In some embodiments, an application store is allowed to access quality indications of computer application releases it sells. In some embodiments, quality indications of one or more computer application releases are open for any users to access so long as network access to the computer application quality measurement system (102) is available to the users.

More or fewer entities depicted in FIG. 1 may be present in a specific configuration for computing and accessing quality indicators of computer application releases or computer applications. For example, in some embodiments, there may be no application store present in an actual configuration; computer application releases can be delivered to user devices or launched by users without any participation of application stores. In some embodiments, one or more separately depicted entities in FIG. 1 may be a single system, a single device, etc., in a specific configuration for computing and accessing quality indicators of computer application releases or computer applications. For example, an application quality query client can also be a user device, an application store, an application server, etc.

3. Application Event Report Emitter

Figure 2:
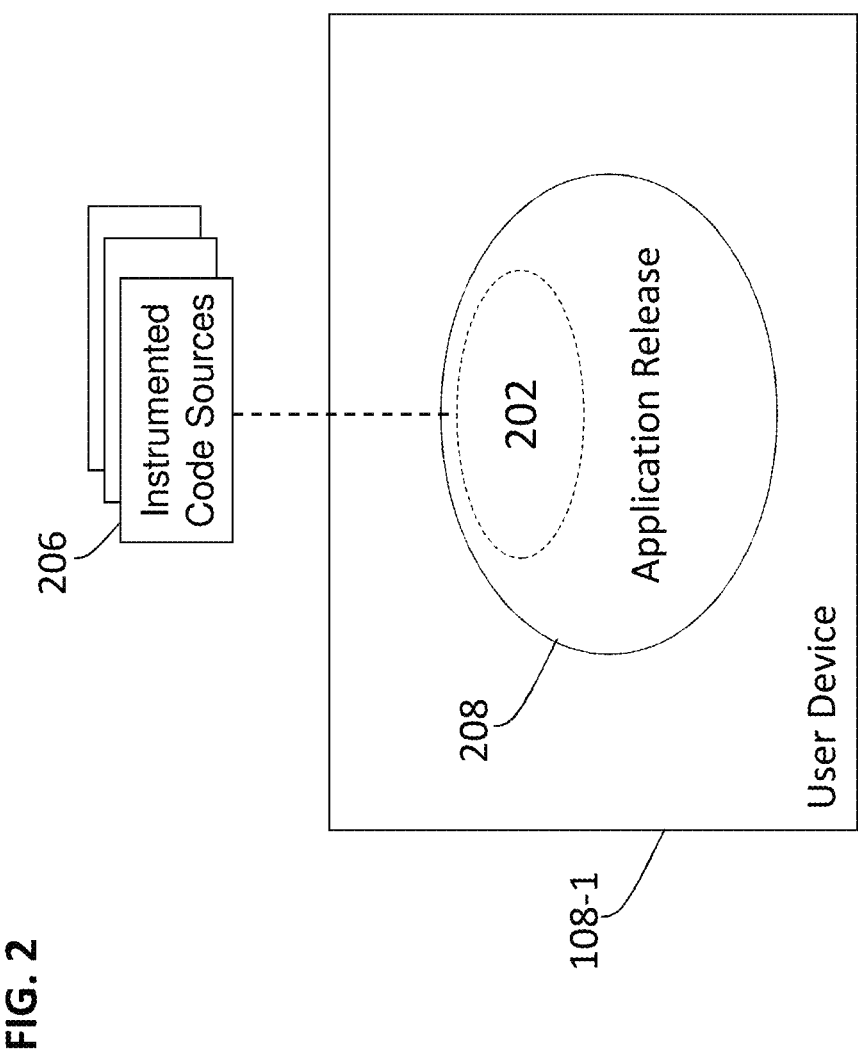
FIG. 2 depicts an example application event report emitter on a user device.

FIG. 2 depicts example application event report emitter 202 on a user device 108-1 (e.g., one of the user devices 108 of FIG. 1, etc.). As used herein, an application event report emitter (e.g., 202, etc.) refers to an entity that is configured to generate one or more application event reports, send the application event reports, as triggered by events of launches, abnormal terminations, etc., of a computer application release (e.g., 208, etc.) on a user device (e.g., 108-1, etc.), to a computer application quality measurement system (e.g., 102 of FIG. 1, etc.), etc. In some embodiments, the application event report emitter (202) may be a part of the crashing application release and may implement an exception catching routine that catches an exception indicative of an impending crash of the crashing application release and sends one or more application event reports indicating the impending crash to the computer application quality measurement system (102). In some embodiments, the application event report emitter (202) may be a part of an application monitor (which optionally or additionally may be configured to launch, clean up, etc., the application release) and may implement an event reporting routine that detect a crash of the previously running application release and sends one or more application event reports indicating the crash to the computer application quality measurement system (102). In some embodiments, such an application monitor may be a part of an operating system (e.g., IOS, linux, Windows, Android, etc.), a virtual machine (e.g., a Java virtual machine, a virtual machine running on a host, etc.), etc., in which the crashing application release was running. In some embodiments, the application event report emitter (202) may send some or all application event reports in real time, for example, immediately after events that trigger the application event report occur. In some embodiments, the application event report emitter (202) may send some or all of the application event reports after delays of some length (e.g., when network access is available for sending the reports to a recipient system, etc.) from the times when events that trigger the application event report occur.

In some embodiments, the application event report emitter (202) may send some or all of the application event reports directly to the computer application quality measurement system (102). In some embodiments, the application event report emitter (202) may send some or all of the application event reports indirectly to the computer application quality measurement system (102) through one or more intermediate systems, one or more intermediate devices, etc.

An example of application event report emitter may include, but are not limited to only, any of: a computer application release (or an executable instance of the computer application release), an operating system in which a computer application release (or an executable instance of the computer application release) is launched, an application process monitor that monitors a computer application release (or an executable instance of the computer application release) on a user device, etc.

In some embodiments, the application event report emitter (202) comprises specifically instrumented code (e.g., functions, methods, classes, variables, sequences of computing instructions, etc.) for some or all of the functionality involved in generating, sending, etc., application event reports. Instrumented code refers to specific source code or binary code incorporated into or implemented by an application release for emitting logging messages, traces, application event reports, etc. The instrumented code may be generated, derived, etc., from an instrumented code source (206) such as a system development kit (SDK), a computer code library, a file, a class, a compiler, an assembler, etc.

An application event report may comprise a plurality of data items. Examples of data items in an application event report may include, but are not limited to only, any of: a unique user identifier (UUID), a computer application release identifier, a clock line indicating a time at which a corresponding event (e.g., an application launching event, an application abnormal termination event, an impending application abnormal termination, etc.) that triggers the generation of the application event report occurs, a type (e.g., an application launching event, an application abnormal termination event, etc.) of event, a user device identifier, an operating system identifier, geo location information about a geo location at which the event occurs, information about system conditions under which the event occurs, etc.

Under techniques as described herein, errors (e.g., as indicated in collected application event reports, etc.) that cause crashes of an application or an application release can be classified as specific types of errors: for example, "out of memory errors," "timeout errors," etc. In some embodiments, an application quality score (e.g., as computed in expressions (2) and (3), etc.) can be calculated to indicate (or to be based at least in part on) a ratio of the number of unique users of an application or an application release that experience a specific type of error (e.g., "out of memory errors," "timeout error," etc.) and the total number of unique users of the application or the application release, in a given time period. In an example, a first application quality score specific to "out of memory errors" may be determined as a ratio of the number of unique users of an application or an application release that experience "out of memory errors" and the total number of unique users of the application or the application release, in a time period (e.g., current week, current month, previous week, previous month, etc.). In another example, a second application quality score specific to "timeout errors" may be determined as a ratio of the number of unique users of an application or an application release that experience "timeout errors" and the total number of unique users of the application or the application release, in a time period (e.g., current week, current month, previous week, previous month, etc.).

In some embodiments, an application quality score (e.g., as computed in expressions (2) and (3), etc.) can be calculated to indicate (or to be based at least in part on) a ratio of the number of unique users of an application or an application release that runs in a specific type of operating environments or systems (e.g., IOS, Android, etc.) and the total number of unique users of the application or the application release (that runs in the specific type of operating environments or systems), in a given time period. In an example, a third application quality score specific to IOS may be determined as a ratio of the number of unique users of an application or an application release that runs in the IOS and the total number of unique users of the application or the application release (that runs in the IOS), in a time period (e.g., current week, current month, previous week, previous month, etc.). In another example, a fourth application quality score specific to Android may be determined as a ratio of the number of unique users of an application or an application release that runs in the Android and the total number of unique users of the application or the application release (that runs in the Android), in a time period (e.g., current week, current month, previous week, previous month, etc.). In some embodiments, an application quality score can be even made specific to a version of operating environment or system. In some embodiments, a separate application quality score can be computed for each of different versions of the same type of operating environment or OS.

In some embodiments, an application quality score (e.g., as computed in expressions (2) and (3), etc.) can be calculated to indicate (or to be based at least in part on) a ratio of the number of unique users of an application or an application release who are located at a specific geo location (e.g., a country, a state, a city, a township, within a geographic area, etc.) and the total number of unique users of the application or the application release (who are located at the specific geo location), in a given time period. In an example, a fifth application quality score specific to Philadelphia may be determined as a ratio of the number of unique users of an application or an application release who are in Philadelphia and the total number of unique users of the application or the application release (who are in Philadelphia), in a time period (e.g., current week, current month, previous week, previous month, etc.). In another example, a sixth application quality score specific to San Francisco may be determined as a ratio of the number of unique users of an application or an application release who are in San Francisco and the total number of unique users of the application or the application release (who are in San Francisco), in a time period (e.g., current week, current month, previous week, previous month, etc.).

In some embodiments, an application quality score (e.g., as computed in expressions (2) and (3), etc.) can be calculated to indicate (or to be based at least in part on) a ratio of the number of unique users of an application or an application release that runs on a specific type of devices (e.g., Samsung, Apple, HTC, etc.) and the total number of unique users of the application or the application release (that runs on the specific type of devices), in a given time period. In an example, a seventh application quality score specific to Samsung devices may be determined as a ratio of the number of unique users of an application or an application release that runs on a Samsung device and the total number of unique users of the application or the application release (that runs on a Samsung device), in a time period (e.g., current week, current month, previous week, previous month, etc.). In another example, a fourth application quality score specific to Apple devices may be determined as a ratio of the number of unique users of an application or an application release that runs on an Apple device and the total number of unique users of the application or the application release (that runs on an Apple device), in a time period (e.g., current week, current month, previous week, previous month, etc.). In some embodiments, an application quality score can be even made specific to a version of operating environment or system. In some embodiments, separate application quality scores can be computed for different models or versions of devices from the same vendor.

In various embodiments, an application event report may consist of more or fewer data items than those as mentioned herein. In some embodiments, some data items may be optional; an application event report may omit those data items. In some embodiments, some data items (e.g., UUID, a computer application release identifier, one or more data items specifying the time of occurrence of a triggering event, one or more data items specifying the type of the triggering event, etc.) may be required; an application event report may not omit those data items. Different implementations may define, select, designate, etc., different sets of data items as optional, required, etc.

A UUID represents an (e.g., alphanumeric, binary, composite, etc.) identifier that distinctly identifies a user from all other users. In some embodiments, a UUID is an identifier of a registered user of a user device (e.g., a mobile device, a tablet device, a laptop computer, a desktop computer, a wearable computing device, etc.).

A computer application release identifier represents an (e.g., alphanumeric, binary, composite, etc.) identifier that distinctly identifies a computer application release from all other computer application releases. In some embodiments, a computer application release identifier is an identifier assigned by an application developer of the computation application release, an application store, an application server, etc.

4. Application Quality Measurement System

Figure 3:
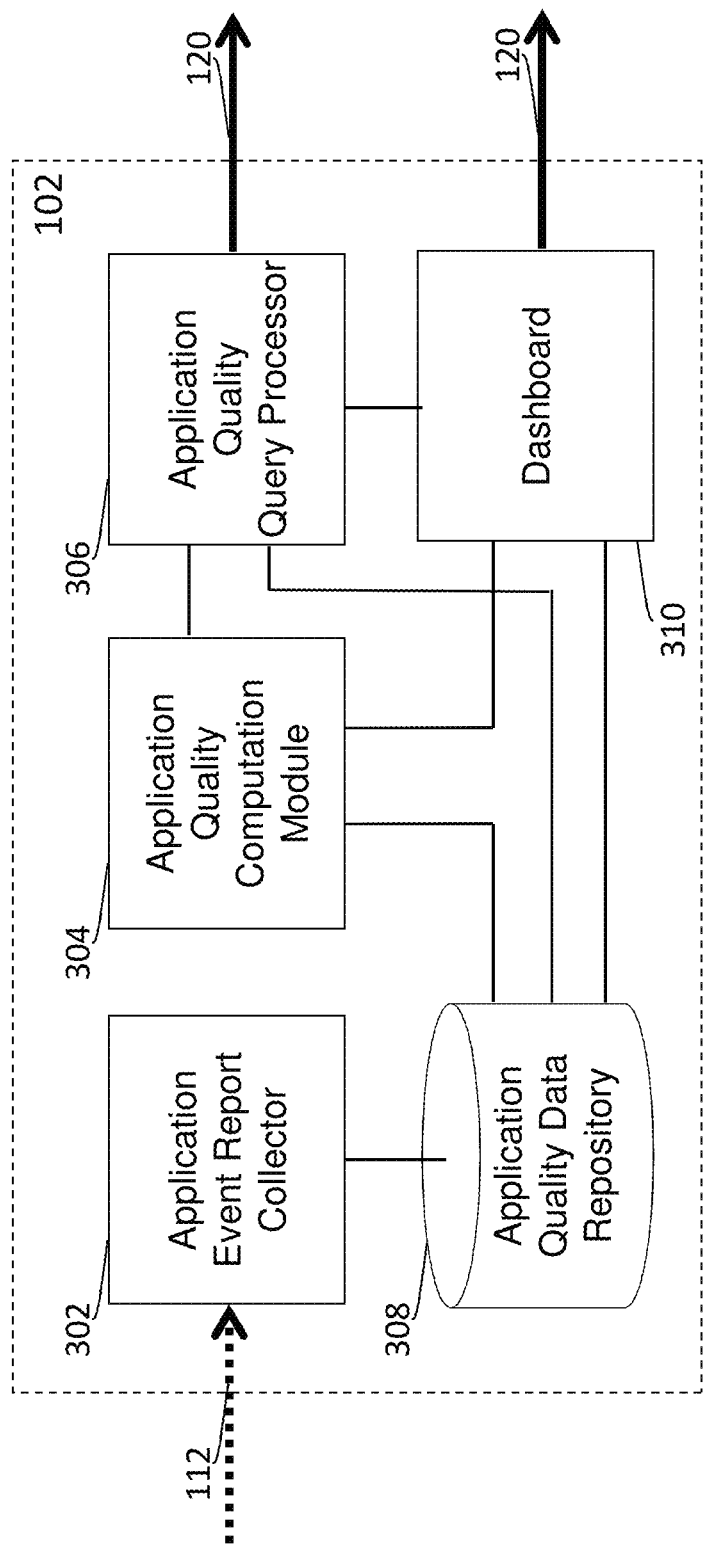
FIG. 3 depicts an example application quality measurement system.

FIG. 3 depicts an example application quality measurement system (e.g., 102 of FIG. 1, etc.). In various embodiments, the application quality measurement system (102) may be implemented as a single server system, a system comprising a set of multiple servers, etc. In some embodiments, the application quality measurement system (102) comprises an application event report collector 302, an application quality computation module 304, an application quality query processor 306, an application quality data repository 308, an application dashboard 310, etc.

In some embodiments, the application event report collector (302) comprises software components, hardware components, a combination of software and hardware components, etc., configured to collect application event reports from any of a variety of user devices (e.g., the user devices 108 of FIG. 8), store the application event reports in the application quality data repository (308), etc. In some embodiments, at least some of the application event reports are collected in real time or in near real time by the application event report collector (302) immediately (e.g., within a second, within a fraction of a second, within a fixed number of seconds, etc.) after events triggering the application event reports occur. In some embodiments, at least some of the application event reports are collected by the application event report collector (302) after various delays (e.g., when network access is available for sending the reports to a recipient system, etc.) from the times when events triggering the application event reports occur.

An application event report may be received by the computer application quality measurement system (102), or the application event report collector (302) therein, over a connection-oriented, or alternatively connection-less, network transport. The application event report can be formatted in any of a variety of data formats including but not limited only to XML, HTML, delimited text, a binary format, a short-message-service (SMS) message, instant messages, etc.

In some embodiments, the application event report collector (302) is configured to receive and store application event reports into the application quality data repository (308). Additionally, optionally, or alternatively, in some embodiments, the application event report collector (302) is configured to process application event reports as received, generate processed information based on the application event reports, store the processed information, etc., into the application quality data repository (308). In some embodiments, the processed information may comprise more concise information than that in the application event reports. In some embodiments, the processed information may incorporate additional information (e.g., reference information such as a subscriber name, etc., retrieved from a reference data table at a server system based on a subscriber ID or device ID received in an application event report, etc.) from other available data sources—other than application event report emitters that send the application event reports—that may or may not be resident at the computer application quality measurement system (102).

In some embodiments, the latest application event report of a specific type (e.g., application launch event type, application abnormal termination event type, events indicating specific errors, events indicating specific operating environments or systems, events indicating specific vendors/models, events indicating specific geo locations, etc.) from a unique user is stored in a specific application event report set—e.g., in the application quality data repository (308), etc.—that is designated to store the latest application event reports of the specific type from all unique users; up to only one such application event report may be stored in the specific application event report set. The application quality computation module (304) can make use of such an application event report set, or a collection of such application event report sets for a plurality of event types, to generate quality indications relatively efficiently and responsively of a specific computer application release, two or more computer application releases, up to all computer application releases for which application event reports are collected.

In some embodiments, the application quality data repository (308) comprises software components, hardware components, a combination of software and hardware components, etc., configured to store application event reports, processed information generated from the application event reports, additional information (e.g., reference information, configuration information, operational parameter values, system and/or user settings, authentication and/or authorization information, etc.) that is used in the operations of the computer application quality measurement system (102), etc.

The application quality data repository (308) can include, but is not limited to only, any of: relational databases, object-oriented databases, non-relational non-object-oriented databases, file-based databases, multi-dimensional database, networked databases, cloud-based, on-premise, etc. In some embodiments, the application quality data repository (308) is configured to support a set of data access operations such as related to defining, storing, retrieving, modifying, merging, deleting, etc., application event reports, processed information generated from the application event reports, application quality computation results, etc., for example, as performed by one or more of the application event report collector (302), the application quality computation module (304), other modules in the computer application quality measurement system (102), other devices other than the computer application quality measurement system (102), etc. Data items received from application event reports, processed information, etc., may be stored in one or more data sets (e.g., data files, data tables, data objects, etc.) in the application quality data repository (308).

In some embodiments, the application quality computation module (304) comprises software components, hardware components, a combination of software and hardware components, etc., configured to be invoked (e.g., by the application quality query processor 306, etc.) to compute quality scores of computer application releases for which application event reports have been collected. For example, the application quality computation module (304) can receive a request for computing quality scores of one or more computer application releases from the application quality query processor 306, retrieve application event reports, process information generated from the application event reports, etc., related to the computer application releases from the application quality data repository (308), compute one or more quality indications of the computer application releases, etc.

In some embodiments, a request for computing quality scores, as received by the application quality computation module (304), may identify a specific computer application release with a specific computer application identifier specified in the request or with information (specified in the request) that can be used to generate such a specific computer application identifier. In some embodiments, a request for computing quality scores may confine data to be used to compute quality scores to a subset of all the data available for computing the quality scores. For example, the request may identify data received from a subset of user devices to be used for such computing. The subset of user devices may be based on a geographic locations (e.g., as indicated by GPS coordinates of the user devices, on a stretch of a highway, in a shopping mall, etc.), mobile communication carriers (e.g., AT&T, T-Mobile, Verizon, a carrier that offers a mobile application, etc.), time of day (e.g., rush hour, non-busy-hours, etc.), operating systems (e.g., Android, IOS, Windows, Windows RT, etc.), etc.

In some embodiments, a request for computing quality scores, as received by the application quality computation module (304), may comprise computer application information to identify a specific computer application but not any specific computer application releases. The application quality computation module (304) may be configured to identify the specific computer application based on the computer application information provided in the request; and further identify, based at least in part on the identified specific computer application, one or more specific computer application releases of the specific computer application. In some embodiments, the application quality computation module (304) is configured to identify, based on the identified specific computer application, a fixed number (e.g., the last two, etc.) of computer application releases of the specific computer application.

The identification of a computer application release based on an identified specific computer application can be made in any of a number of methods. In an example, a reference data set comprising a mapping between computer applications and computer application releases may be queried with a search key identifying the specific computer application. In another example, a dataset comprising application event reports may be queried with computer application information identifying the specific computer application. Multiple computer application releases of the specific computer applications can be ordered by their release times, by a logical number indicating a release time order, etc. In some embodiments, up to a fixed number (e.g., the last two, etc.) of computer application releases of the specific computer application may be selected if more than the fixed number of computer application releases of the specific computer application is returned from querying the data sets.

In some embodiments, the application quality query processor (306) comprises software components, hardware components, a combination of software and hardware components, etc., configured to receive one or more computer application quality queries (or requests for quality indications of computer applications or computer application releases) from one or more application quality query clients (e.g., query devices 110 of FIG. 1, application dashboard 310, etc.); based at least in part on the computer application quality queries, identify one or more of specific computer applications, specific computer application releases, specific time periods, etc., for which quality scores are to be computed, etc. In some embodiments, the application quality query processor (306) is configured to retrieve pre-computed quality scores of the identified computer applications, the identified computer application releases in the identified time periods from the application quality data repository (308). In some embodiments, the application quality query processor (306) is configured to send quality score requests to the application quality computation module (304), receive quality scores of the identified computer applications, the identified computer application releases in the identified time periods from the application quality computation module (304). In response to the computer application quality queries, the application quality query processor (306) returns the quality scores of the identified computer applications, the identified computer application releases in the identified time periods to the application quality query devices (110).

Figure 4:
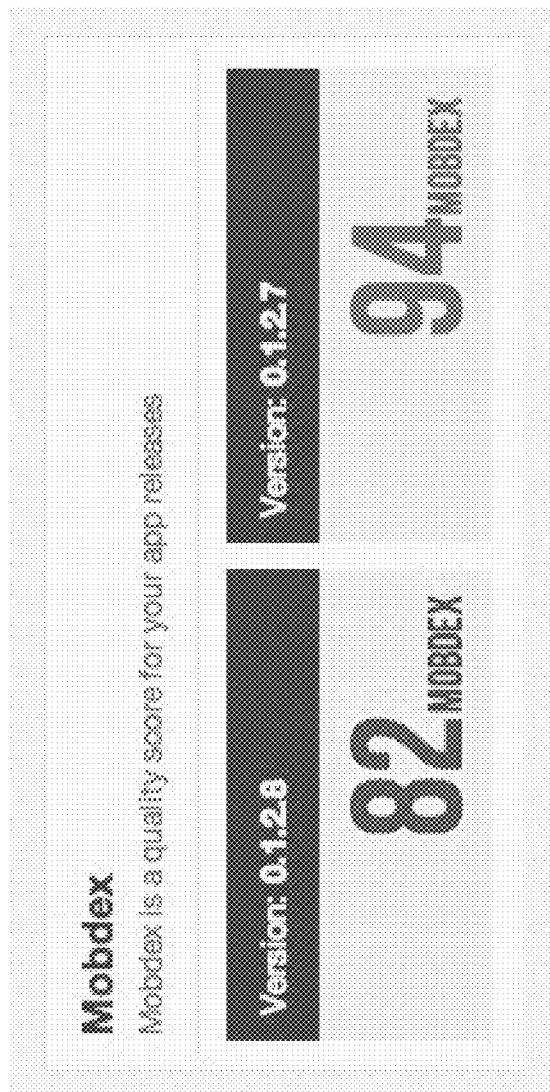
FIG. 4 depicts an example display page that provides quality indicators of a computer application.

In some embodiments, the application dashboard (310) comprises software components, hardware components, a combination of software and hardware components, etc., configured to provide graphic user interface (GUI) based access for application quality information to client devices such as any of the application quality query devices (110), etc. For example, the application dashboard (310) can be configured to display a list of computer applications (e.g., an IOS application, an Android application, a Windows application, etc.) available for downloading/installation/launching to a user on a user device; receive user input representing a request for accessing quality scores of a specific computer application; in response to receiving the user input, send a query to the application quality query processor (308); receive application quality scores of the two latest versions of the specific computer application from the application quality query processor (308) in a response to the query; provide a graphic display page of the application quality scores of the two latest versions of the specific computer application, as illustrated in FIG. 4.

5. Example Quality Score Computations

In some embodiments, the computer application quality measurement system (102), or the application quality computation module (304) therein, is configured to determine the total number of unique users who have launched a specific computer application release, the total number of affected unique users who have experienced an abnormal termination of the specific computer application release, etc., within a specific bounded or unbounded time range.

A bounded time range refers to a time interval with a specific start time and a specific end time. In some embodiments, a bounded time range may correspond to a calendar week, a calendar month, a different fixed timer period, etc. An unbounded time range refers to a time range with a specific end time but no specific start time. A specific end time can be implicitly a time at which a request for a quality indication of the specific computer application release is received by the computer application measurement system (102), or an explicit time specified in a request for a quality indication of the specific computer application release as received by the computer application measurement system (102), etc.

The total number of unique users (e.g., individuals, visitors, subscribers, employees, etc.) for a computer application release (e.g., a release or version of a mobile application, etc.) in a bounded or unbounded time range refers to the number of distinct users using a computer application release in the time range, regardless of how often each of these distinct users uses the computer application release in the time range.

For example, a user as represented by a UUID may start multiple sessions of a computer application release at multiple different times in a time range such as a 7-day time range, a 30-day time range, etc. To determine the total number of unique users in the time range for the computer application release, the user as represented by the UUID will be counted only once in the total number of unique users. Accordingly, the total number of unique users who have launched a specific computer application release, or the total number of affected unique users who have experienced an abnormal termination of the specific computer application release, in a bounded or unbounded time range refers to the number of distinct users who have launched the specific computer application release, or who have experienced an abnormal termination of the specific computer application release, in the time range, regardless of how often each of these distinct users has launched the specific computer application release, or has experienced an abnormal termination of the specific computer application release, in the time range.

In some embodiments, multiple users may share a user device. In some embodiments, for the purpose of determining the total number of unique users or the total number of affected unique users, each of the multiple users who share a user device is counted as a unique user; for example, each of the multiple users who share the user device is assigned a UUID that is different (or unique) from all other UUIDs assigned to other users including the others of the multiple users sharing the same user device.

In some other embodiments, for the purpose of determining the total number of unique users or the total number of affected unique users, multiple users who share a single user device are counted as a single unique user; for example, all of the multiple users who share the same user device are assigned the same UUID.

In some embodiments, for the purpose of determining the total number of unique users or the total number of affected unique users, a user who uses multiple user devices is counted as a single unique user; for example, a unique user is identified by, or assigned with, only a single UUID that is different from all other UUIDs that identify other unique users regardless of which user device the unique user uses to launch a computer application release. This may be tracked using a login process, identification process, etc., that a user device has available to it. To the extent crashes experienced by a user can be used as a proxy for user satisfaction, techniques as described herein can be used to determine how many times a given user has experienced a crash in using a particular application or a release thereof no matter which devices the given user uses to run the particular application or the release thereof. The same user may use many cloud-based applications on multiple devices such as application releases or versions on tablets, desktop computers, smart phones, etc.

In some other embodiments, for the purpose of determining the total number of unique users or the total number of affected unique users, a user (e.g., an individual, a natural person, etc.) who uses multiple user devices is required to use a different UUID and is counted as a different unique user on each different user device of the multiple user devices.

In some embodiments, the computer application quality measurement system (102) is configured to determine the total number of unique users who have launched a specific computer application release from one or more specific types of application event reports such as application launch event reports, etc., as received from application event report emitters (e.g., 202, etc.) of the specific computer application release on their respective user devices (e.g., 304, etc.) and as stored in the application quality data repository (308).

For example, a computer application release comprising specific instrumented code (e.g., from a bug tracking SDK, etc.) for emitting application event reports can emit an application launch event report (e.g., a "ping", etc.) each time a user launches the computer application release on a user device. This application launch report event may be sent immediately after the event of launching the computer application release occurs, or after a delay (for example, when the user device such as a mobile device obtains network access to a computer application quality measurement system such as 102 of FIG. 1, etc.).

In some embodiments, each of the application launch report events received by the computer application quality measurement system (102) comprises a UUID representing a unique user, from which the total number of unique users can be counted for a given time range such as a 7-day time range, a 30-day time range, any time before now, any time before a specific time in the past, etc.

In some embodiments, the computer application quality measurement system (102) is configured to determine the total number of affected unique users who have experienced abnormal terminations of a specific computer application release from one or more specific types of application event reports such as application abnormal termination event reports, etc., as received from application event report emitters (e.g., 202, etc.) of the specific computer application release on their respective user devices (e.g., 304, etc.) and as stored in the application quality data repository (308).

For example, a computer application release comprising specific instrumented code (e.g., from the bug tracking SDK, etc.) for emitting application event reports can emit an application abnormal termination event report (e.g., a "crash" event report, etc.) each time a user experiences an abnormal termination of the computer application release on a user device. This application abnormal termination report event may be sent immediately after the event of launching the computer application release occurs, or after a delay (for example, when the user device such as a mobile device obtains network access to a computer application quality measurement system such as 102 of FIG. 1, etc.).

In some embodiments, each of the application abnormal termination report events received by the computer application quality measurement system (102) comprises a UUID representing a unique user, from which the total number of affected unique users can be counted for a given time range such as a 7-day time range, a 30-day time range, any time before now, any time before a specific time in the past, etc.

In some embodiments, the application quality computation module (306) is configured to use the total number of unique users and the total number of affected unique users in a time period as some or all numeric input in computing a quality score of the specific computer application release in the time period.

For example, a quality score, denoted as "MobDex_r", of a computer application release may be computed as a percentage of the total number of unaffected unique users in the total number of unique users, as shown in the following expression (which may be referred to as expression (1)):

$$MobDex\_r = 100*(unique\_users - unique\_users\_affected)/unique\_users \quad (1)$$

where "unique_users" denotes the total number of unique users, and "unique users affected" denotes the total number of affected unique users.

In some embodiments, a computer application may have multiple releases or versions. In some embodiments, the application quality computation module (306) is configured to use individual quality scores of (e.g., all, some, a fixed number of, etc.) individual computer application releases of a computer application in a time period as some or all numeric input in computing a quality score of the specific computer application in the time period.

For example, a quality score, denoted as "Average_MobDex", of a computer application in a time period may be computed as an average of the quality scores of two latest computer application releases of the computer application in the time period if the computer application has at least two computer application releases being used in the time period, as illustrated in the following expression (which may be referred to as expression (2)):

$$Average\_MobDex = (MobDex\_r\_1 + MobDex\_r\_2)/2 \quad (2)$$

where "MobDex_r_1" denotes the quality score of the latest-released version of the computer application being used in the time period, and "MobDex_r_2" denotes the quality score of the version of the computer application released immediately before the version of the application reflected in MobDex_r_1 and being used in the time period.

For example, a computer application may have multiple computer application releases representing different versions of the computer application in a time period. Two latest computer application releases of the computer application in the time period may have version numbers of "ver 2.20.1" and "ver2.20.0", respectively. The version "ver 2.20.1" of the computer application may have a quality score (denoted as MobDex_r_1) of 89 in the time period, whereas the version "ver 2.20.0" of the computer application may have a quality score (denoted as MobDex_r_1) of 95 in the same time period. As a result, a quality score, such as "Average_MobDex", of the computer application in the time period may be computed as an average of the two quality scores of the two latest versions, namely 92.

Techniques as described herein provide a number of benefits over other approaches that do not implement these techniques. For example, a user can launch a computer application release multiple times in a specified time range. Thus, the total number of sessions could be greater, or even much greater, than the number of unique users to various possible extents. As a result, a quality measure computed with numeric input that does not distinguish unique users does not represent a competent measure to indicate how many natural persons, individuals, etc., are satisfied with or affected by problems of a computer application or computer application release. In an extreme case, all fifty (50) launches of a computer application release in a time range may be made by the same user. Thus, only one user would have been affected if all these launches had resulted in abnormal terminations of the computer application release. On the other hand, all fifty (50) launches of a computer application release in a time range may be also made by 50 unique users. Thus, all fifty distinct users could have been affected if all these launches had resulted in abnormal terminations of the computer application release.

In contrast, quality indicators computed under techniques as described herein are based on numbers of unique users (e.g., unique individuals, unique visitors, etc.). As a result, uncertainty, inaccuracy, unreliability, etc., in computing quality indicators over a wide range of possible data sets can be prevented or reduced as compared with other approaches.

In addition, quality indicators computed based on numbers of unique users are consistent with popularity measures that are computed based on the same numbers of unique users. The quality indicators can be used by a variety of clients including, but not limited to only, any of: advertisers who use computer application releases to advertise, investors interested in application developers or computer applications, potential clients interested in gauging/tracking the quality and popularity of computer applications, etc., with the popularity measures computed on the same basis.

In some embodiments, the quality of a specific computer application release or computer application needs to be evaluated against those of many other available computer application releases or other available computer applications. For example, if a computer application release has only a single unique user in a time period, then the quality score of the computer application release will be either 100% or 0% in the time period, neither of which is likely to be an adequate indication of the actual quality of the computer application release in a large user population in the time period.

In some embodiments, the application quality computation module (306) is configured to compute a weighted quality score, denoted as "Weighted_MobDex", of a specific computer application release or a specific computer application, in a specific time period. In some embodiments, the computation of the weighted quality score in the time period takes into account one or more factors including, but not limited to, any of: other quality scores of other computer application releases or other computer applications in the time period, popularity of the specific computer application release or the specific computer application in the time period, popularity of the other computer application releases or the other computer applications in the time period, etc.

In some embodiments, the application quality computation module (306) is configured to determine an individual quality score (e.g., an "average_MobDex", etc.) in a time period for each individual computer application in a plurality of computer applications that correspond to a plurality of computer application releases for which application event reports are collected by the computer application quality measurement system (102), determine an overall quality score in the time period across all computer applications in the plurality of computer applications based on individual quality scores of all the computer applications, etc. In some embodiments, the overall quality score in the time period is computed as an average (denoted as "all_average_mobdex") of all the individual quality scores in the time period of all the computer applications in the plurality of computer applications.

In some embodiments, the application quality computation module (306) is further configured to determine (1) an individual total number of unique users (denoted as "application_unique_users") in the time period for each individual computer application in a plurality of computer applications that correspond to a plurality of computer application releases for which application event reports are collected by the computer application quality measurement system (102), and then determine an average total number of unique users (denoted as "all_average_sessions") in the time period by averaging all individual total numbers of unique users (as determined in (1) above) over all the computer applications in the plurality of computer applications.

In some embodiments, the individual total number of unique users ("application_unique_users") in the time period as previously mentioned can be determined for a fixed number of most recent versions or releases of a computer application (e.g., each individual computer application in the plurality of computer applications as previously mentioned, etc.). The fixed number of most recent versions or releases of the computer application may consist of the same versions or releases of the computer application that are used to compute an individual quality score (e.g., an "average_MobDex" as previously mentioned, etc.) for the computer application in the time period.

In some embodiments, an individual total number of unique users in a time period for an individual computer application as described herein can be computed as the total number of distinct users who have launched any of a fixed number of computer application releases representing the latest versions of the individual computer application in the time period, regardless of which specific computer application release of the fixed number of computer application releases was launched in the time period.

In some embodiments, the application quality computation module (306) is configured to use an individual quality score (e.g., denoted as "average_MobDex" in expression (2), etc.) of a specific computer application, an individual total number of unique users (e.g., "application_unique_users", etc.) of the specific computer application, an average (e.g., "all_average_mobdex", etc.) of all individual quality scores of all the computer applications in a plurality of computer applications, an average total number of unique users (e.g., "all_average_sessions", etc.) of all individual total numbers of unique users of all the computer applications in the plurality of computer applications, all in the same time period, as some or all numeric input in computing a weighted quality score of the specific computer application in the time period, as illustrated in the following expression (which may be referred to as expression (3)):

$$\text{weighted\_MobDex} = (\text{average\_MobDex} * \text{unique\_users} + \text{all\_average\_MobDex} * \text{all\_average\_sessions}) / (\text{unique\_users} + \text{all\_average\_sessions}) \quad (3)$$

where "average_MobDex" is defined in expression (2) and is an application quality score of the specific computer application in the time period; "unique_users" is defined in expression (1) and is the number of unique users for the specific computer application in the time period; "all_average_MobDex" is the above mentioned average of all individual quality scores of all the computer applications in the plurality of computer application in the time period; and "all_average_sessions" is the above mentioned average total number of unique users (e.g., "all_average_sessions", etc.) of all individual total numbers of unique users of all the computer applications in the plurality of computer applications in the time period.

The weighted quality score (e.g., "weighted_MobDex", etc.) of a computer application has some advantage over the "plain" unweighted quality score (e.g., "average_Mobdex", etc.) because the computation of the weighted quality score includes metrics from all computer applications in a plurality of computer applications, for which the computer application quality measurement system (102) collects application event reports. A basic aspect that differentiates the computations of the weighted quality score and the unweighted quality score is represented by the inclusion of popularities of all the computer applications in the plurality of computer applications in the computation of the weighted quality score.

For example, even when a computer application has produced zero, or very few crashes, the computer application will not be given a quality score of near 100 if the computer application is not a popular computer application among a plurality of computer applications. However, if the computer application has a total number of unique users in a time period that is comparable to, or much larger (e.g., two times, three times, etc.) than, the average total number of unique users across all the computer applications in a plurality of computer applications, the contribution of the quality score computed based on data intrinsic to the computer application will be relatively significant, or even dominant.

It should be noted that various ways of incorporating factors other than the population and data intrinsic to a specific computer application or a specific computer application release may be used to evaluate the quality of the specific computer application. For example, cutoffs, thresholds, user input, default values, subjectively determined relevant values, etc., can be incorporated in the computation of the quality of a specific computer application release or a specific computer application release, for example, in order to minimize the impact of large deviations when a data set is small, etc.

6. Example Process Flows

FIG. 5A illustrates an example process flow. In some embodiments, this process flow is performed through one or more computing devices or units. In block 502, a computer application quality measurement system (e.g., 102 of FIG. 1, etc.) determines a first number of unique users for a computer application release. The first number of unique users represents a total number of unique users who have launched the computer application release on user devices.

In block 504, the computer application quality measurement system (102) determines a second number of unique users for the computer application release. The second number of unique users represents a total number of unique users who have encountered at least once an abnormal termination with the computer application release on user devices.

In block 504, the computer application quality measurement system (102) uses the determined first number of unique users and the determined second number of users as numeric input to compute a quality score for the computer application release.

In an embodiment, the first number of unique users is determined for a specific time range, and wherein the second number of unique users is determined in the same specific time range. In an embodiment, the specific time range is determined based on a time at which a request for a quality indication of a specific computer application is received, and wherein one or more versions of the specific computer application include the computer application release. In an embodiment, the specific time range is determined based on a time specified in a request for a quality indication of a specific computer application, and wherein one or more versions of the specific computer application include the computer application release.

In an embodiment, the computer application quality measurement system (102) is further configured to perform: collecting application event reports from each user device in a plurality of user devices, on each of which at least one computer application release in a set of computer application releases has been launched, wherein the application event reports comprise one or more application launch log events of the individual computer application release and zero or more application abnormal termination events of the individual computer application release; and determining, based on the one or more application launch log events of the computer application release and the zero or more application abnormal termination events of the computer application release, the first number of unique users and the second number of unique users.

In an embodiment, each of the one or more application launch log events of the computer application release and the zero or more application abnormal termination events of the computer application release is emitted from one of the computer application release or an operating system in which the computer application release was launched.

In an embodiment, at least one of the one or more application launch log events of the computer application release or the zero or more application abnormal termination events of the computer application release is delayed until a user device establishes network access to a quality measurement system.

In an embodiment, each of the one or more application launch log events of the individual computer application release or the zero or more application abnormal termination events of the individual computer application release comprises a unique user identifier (UUID) for a user who has launched the computer application release on a user device; the UUID for the user distinguishes the user from all other users with other UUIDs that each are different from the UUID.

In an embodiment, each of the one or more application launch log events of the individual computer application release or the zero or more application abnormal termination events of the individual computer application release further comprises (a) a computer application release identifier and (2) a time value indicating when a corresponding triggering event occurs.

In an embodiment, the steps of determining a first number of unique users, determining a second number of unique users, and using the first number of unique users and the second number of unique users as numeric input to compute a quality score is performed in response to receiving a request for a quality indication of a specific computer application, and the computer application release represents a version of the specific computer application.

In an embodiment, the steps of determining a first number of unique users, determining a second number of unique users, and using the first number of unique users and the second number of unique users as numeric input to compute a quality score is performed before receiving a request for a quality indication of a specific computer application, and the computer application release represents a version of the specific computer application.

In an embodiment, the computer application quality measurement system (102) is further configured to perform: determining a third number of unique users for a second computer application release, the third number of unique users represents a total number of unique users who have launched the second computer application release, and the computer application release and the second computer application release represent two different versions of a specific computer application; determining a fourth number of unique users for the second computer application release, the fourth number of unique users represents a total number of unique users who have encountered at least once an abnormal termination with the second computer application release; and using the determined third number of unique users and the determined fourth number of users as numeric input to compute a second quality score for the second computer application release.

In an embodiment, the computer application release is an immediate upgrade to the second computer application release for the specific computer application.

In an embodiment, the computer application quality measurement system (102) is further configured to send the quality score and the second quality score to an application quality query client in response to receiving a request for a quality indication of the specific computer application from the application quality query client.

In an embodiment, the computer application quality measurement system (102) is further configured to use the computed quality score and the computed second quality score as numeric input to compute an application quality score for the specific computer application.

In an embodiment, the computer application quality measurement system (102) is further configured to send the application quality score to an application quality query client in response to receiving a request for a quality indication of the specific computer application from the application quality query client.

In an embodiment, the determined first total number of unique users, the determined second total number of unique users, the determined third total number of unique users, the determined fourth total number of unique users, are all related to a specific time range.

Figure 5B:
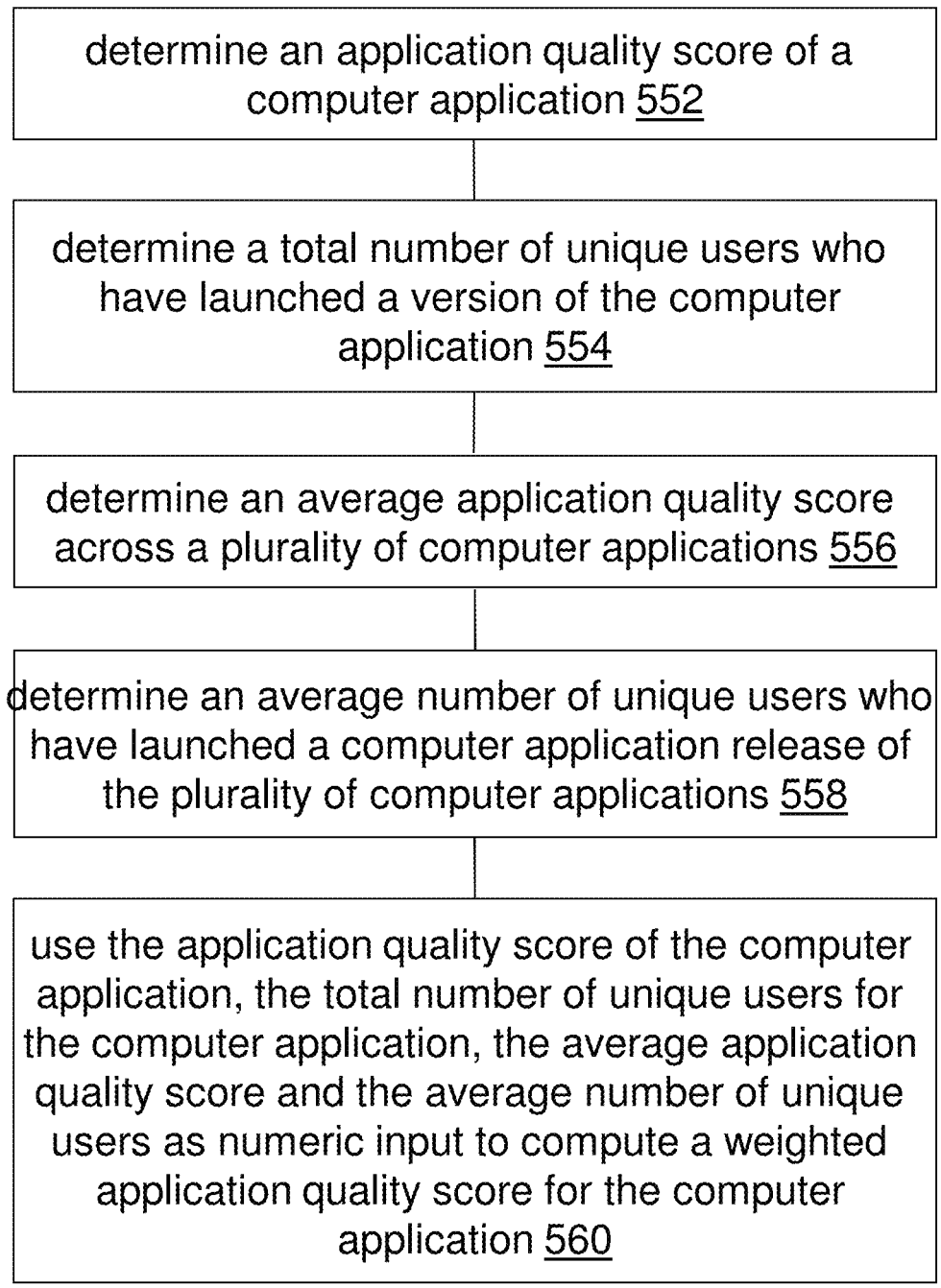

FIG. 5B illustrates an example process flow. In some embodiments, this process flow is performed through one or more computing devices or units. In block 552, a computer application quality measurement system (e.g., 102 of FIG. 1, etc.) determines an application quality score of a specific computer application.

In block 554, the computer application quality measurement system (102) determines a total number of unique users who have launched at least one computer application release that is a version of the specific computer application.

In block 556, the computer application quality measurement system (102) determines an average application quality score across a plurality of computer applications.

In block 558, the computer application quality measurement system (102) determines an average number of unique users, who have launched as least one computer application release in a computer application in the plurality of computer applications;

In block 510, the computer application quality measurement system (102) uses the determined application quality score of the specific computer application, the determined total number of unique users for the specific computer application, the determined average application quality score and the determined average number of unique users as numeric input to compute a weighted application quality score for the specific computer application.

In an embodiment, the determined application quality score of the specific computer application, the determined total number of unique users for the specific computer application, the determined average application quality score, and the determined average number of unique users, are all related to a specific time range.

In an embodiment, the plurality of computer applications includes the specific computer application. In another embodiment, the plurality of computer applications excludes the specific computer application.

In an embodiment, an apparatus comprises a processor and is configured to perform any of the foregoing methods.

In an embodiment, a non-transitory computer readable storage medium, storing software instructions, which when executed by one or more processors cause performance of any of the foregoing methods.

Note that, although separate embodiments are discussed herein, any combination of embodiments and/or partial embodiments discussed herein may be combined to form further embodiments.

In an embodiment, a computing device comprising one or more processors and one or more storage media storing a set of instructions which, when executed by the one or more processors, cause performance of any of the foregoing methods.

7. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
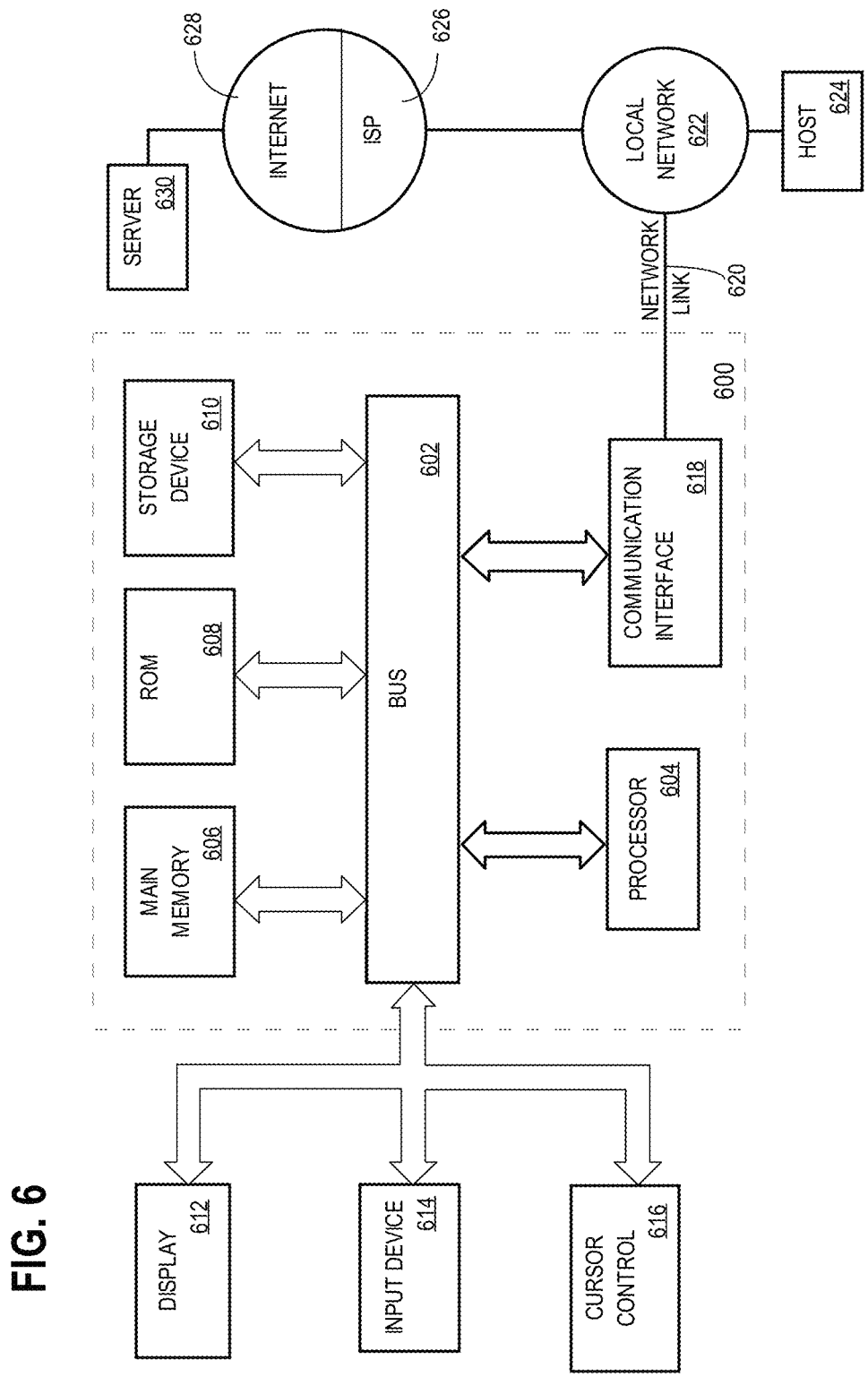
FIG. 6 depicts an example hardware platform on which a computer or a computing device as described herein may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques as described herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

8. Equivalents, Extensions, Alternatives And Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:

monitoring operations of a computer application program executing on a mobile device, among a plurality of mobile devices, using a monitoring code included in the computer application program that sends application performance events relating to the computer application program to a collection device, the application performance events include application performance data relating to the computer application program prior to an error occurring in the computer application program;

receiving, by a server, application performance events from one or more collection devices;

classifying, by the server, the received application performance events into a plurality of specific types of errors by evaluating the application performance data in each application performance event of the received application performance events;

calculating, by the server, a number of unique occurrences of each specific type of error among the plurality of specific types of errors associated with a particular computer application program, the number of unique occurrences of each specific type of error indicating a number of unique users that have launched the particular computer application program and have been affected by the specific type of error; and causing display, by the server, of information relating to a number of unique occurrences of a particular type of error associated with the particular computer application program along with one or more other numbers of unique occurrences of the particular type of error associated with one or more previous versions of the particular computer application program thereby allowing a user to diagnose performance aspects of different versions of the particular computer application program.

2. The method as recited in claim 1,
wherein the calculating the number of unique occurrences further comprises:
calculating the number of unique occurrences of each specific type of error among the plurality of specific types of errors associated with a plurality of versions of the particular computer application program; and
wherein causing display of information further comprises:
causing display of information relating to the number of unique occurrences of the particular type of error associated with the plurality of versions of the particular computer application program.

3. The method as recited in claim 1, further comprising:
wherein the calculating the number of unique occurrences further comprises:
calculating the number of unique occurrences of each specific type of error among the plurality of specific types of errors associated with a plurality of versions of the particular computer application program; and
wherein causing display of information further comprises:
causing display of information relating to the number of unique occurrences of the particular type of error associated with the plurality of versions of the particular computer application program along with an associated version number.

4. The method as recited in claim 1, wherein the display of the information relating to the number of unique occurrences of the particular type of error associated with the particular computer application program is for a specific time period.

5. The method as recited in claim 1, wherein the display of the information relating to the number of unique occurrences of the particular type of error associated with the particular computer application program is for a particular operating system running the particular computer application program.

6. The method as recited in claim 1, wherein the display of the information relating to the number of unique occurrences of the particular type of error associated with the particular computer application program is for a particular geographical area for mobile devices running the particular computer application program.

7. The method as recited in claim 1, wherein the display of the information relating to the number of unique occurrences of the particular type of error associated with the particular computer application program is for a particular mobile device type running the particular computer application program.

8. The method as recited in claim 1, wherein the information relating to the number of unique occurrences of the particular type of error associated with the particular computer application program includes a unique number of users running specific types of operating systems.

9. The method as recited in claim 1, wherein the information relating to the number of unique occurrences of the particular type of error associated with the particular computer application program includes a total number of unique users using the particular computer application program.

10. The method as recited in claim 1, wherein at least one application performance event among the application performance events includes a trace leading up to the error.

11. The method as recited in claim 1, wherein at least one application performance event among the application performance events includes information about system conditions under which the application performance event occurred.

12. A non-transitory computer-readable medium storing one or more sequences of instructions, wherein execution of the one or more sequences of instructions by one or more processors causes the one or more processors to perform:
monitoring operations of a computer application program executing on a mobile device, among a plurality of mobile devices, using a monitoring code included in the computer application program that sends application performance events relating to the computer application program to a collection device, the application performance events include application performance data relating to the computer application program prior to an error occurring in the computer application program;
receiving, by a server, application performance events from one or more collection devices;
classifying, by the server, the received application performance events into a plurality of specific types of errors by evaluating the application performance data in each application performance event of the received application performance events;
calculating, by the server, a number of unique occurrences of each specific type of error among the plurality of specific types of errors associated with a particular computer application program, the number of unique occurrences of each specific type of error indicating a number of unique users that have launched the particular computer application program and have been affected by the specific type of error; and
causing display, by the server, of information relating to a number of unique occurrences of a particular type of error associated with the particular computer application program along with one or more other numbers of unique occurrences of the particular type of error associated with one or more previous versions of the particular computer application program thereby allowing a user to diagnose performance aspects of different versions of the particular computer application program.

13. The non-transitory computer-readable medium as recited in claim 12,
wherein the calculating the number of unique occurrences further comprises:
calculating the number of unique occurrences of each specific type of error among the plurality of specific types of errors associated with a plurality of versions of the particular computer application program; and
wherein causing display of information further comprises:
causing display of information relating to the number of unique occurrences of the particular type of error associated with the plurality of versions of the particular computer application program.

14. The non-transitory computer-readable medium as recited in claim 12,
wherein the calculating the number of unique occurrences further comprises:
calculating the number of unique occurrences of each specific type of error among the plurality of specific types of errors associated with a plurality of versions of the particular computer application program; and
wherein causing display of information further comprises:
causing display of information relating to the number of unique occurrences of the particular type of error associated with the plurality of versions of the particular computer application program along with an associated version number.

15. The non-transitory computer-readable medium as recited in claim 12, wherein the information relating to the number of unique occurrences of the particular type of error associated with the particular computer application program includes a unique number of users running specific types of operating systems.

16. The non-transitory computer-readable medium as recited in claim 12, wherein at least one application performance event among the application performance events includes a trace leading up to the error.

17. The non-transitory computer-readable medium as recited in claim 12, wherein at least one application performance event among the application performance events includes information about system conditions under which the application performance event occurred.

18. A system, comprising:
- a monitoring code included in a computer application program executing on a mobile device, among a plurality of mobile devices, that sends application performance events relating to the computer application program to a collection device, the application performance events include application performance data relating to the computer application program prior to an error occurring in the computer application program;
- an application performance event receiving device, implemented at least partially in hardware at a server, that receives application performance events from one or more collection devices;
- an event classification device, implemented at least partially in hardware at the server, that classifies the received application performance events into a plurality of specific types of errors by evaluating the application performance data in each application performance event of the received application performance events;
- an error occurrence calculation device, implemented at least partially in hardware at the server, that calculates a number of unique occurrences of each specific type of error among the plurality of specific types of errors associated with a particular computer application program, the number of unique occurrences of each specific type of error indicating a number of unique users that have launched the particular computer application program and have been affected by the specific type of error; and
- a display formatting device, implemented at least partially in hardware at the server, that causes display of information relating to a number of unique occurrences of a particular type of error associated with the particular computer application program along with one or more other numbers of unique occurrences of the particular type of error associated with one or more previous versions of the particular computer application program thereby allowing a user to diagnose performance aspects of different versions of the particular computer application program.

19. The system as recited in claim 18, wherein at least one application performance event among the application performance events includes a trace leading up to the error.

20. The system as recited in claim 18, wherein at least one application performance event among the application performance events includes information about system conditions under which the application performance event occurred.

* * * * *